(12) United States Patent
Rankin et al.

(10) Patent No.: US 8,985,936 B2
(45) Date of Patent: Mar. 24, 2015

(54) METHOD AND APPARATUS FOR ORIENTING A LAMINATION

(71) Applicant: Nidec Minster Corporation, Minster, OH (US)

(72) Inventors: Johnathan A. Rankin, St. Marys, OH (US); Rohan V. Patel, Troy, OH (US); David A. Schmitz, Coldwater, OH (US)

(73) Assignee: Nidec Minster Corporation, Minster, OH (US)

( * ) Notice: Subject to any disclaimer, the term of this patent is extended or adjusted under 35 U.S.C. 154(b) by 122 days.

(21) Appl. No.: 13/767,230

(22) Filed: Feb. 14, 2013

(65) Prior Publication Data

US 2014/0072396 A1  Mar. 13, 2014

Related U.S. Application Data

(60) Provisional application No. 61/699,447, filed on Sep. 11, 2012.

(51) Int. Cl.
| | |
|---|---|
| *B26D 7/06* | (2006.01) |
| *B26D 7/24* | (2006.01) |
| *B26F 1/02* | (2006.01) |
| *B65G 49/00* | (2006.01) |
| *B25J 15/00* | (2006.01) |
| *B25J 15/06* | (2006.01) |
| *H02K 15/02* | (2006.01) |
| *B21D 28/22* | (2006.01) |
| *B21D 43/20* | (2006.01) |

(52) U.S. Cl.
CPC ............... *B65G 49/00* (2013.01); *B21D 28/22* (2013.01); *B21D 43/20* (2013.01); *B25J 15/0061* (2013.01); *B25J 15/0608* (2013.01); *H02K 15/02* (2013.01)
USPC ............ 414/796.4; 414/797.1; 414/737; 294/65.5

(58) Field of Classification Search
USPC ....... 269/37, 45; 271/18.1; 29/709; 294/65.5, 294/57.1; 414/589, 590, 606, 736, 737, 414/738, 744.5, 749.1, 749.4, 749.6, 752.1, 414/783, 796.4, 796.5, 796.9, 797, 797.1, 414/936; 901/40
See application file for complete search history.

(56) References Cited

U.S. PATENT DOCUMENTS

| | | | | |
|---|---|---|---|---|
| 1,792,576 | A * | 2/1931 | Dryon | 294/65 |
| 2,474,141 | A | 6/1949 | Chatterton | |
| 3,937,457 | A * | 2/1976 | Schwebel | 271/92 |
| 4,232,575 | A | 11/1980 | Schneider et al. | |
| 4,331,049 | A | 5/1982 | Bergmann et al. | |
| 4,627,785 | A * | 12/1986 | Monforte | 414/730 |
| 5,333,525 | A | 8/1994 | Schlegel | |
| 5,632,595 | A * | 5/1997 | Mori et al. | 414/795.6 |

(Continued)

FOREIGN PATENT DOCUMENTS

DE  2 044 014  6/1972

*Primary Examiner* — Gregory Adams
(74) *Attorney, Agent, or Firm* — Taylor IP, P.C.

(57) ABSTRACT

A method of orienting a selected item from a stack of similar items, the method comprising the steps of separating, engaging and orienting. The separating step separates the selected item from the stack using a first attraction force of a transport apparatus. The engaging step engages the selected item with a second attraction force from the transport apparatus. The second attraction force being greater than the first attraction force. The orienting step orients the selected item relative to the transport apparatus as the transport apparatus is en route to a destination location.

12 Claims, 3 Drawing Sheets

(56) References Cited

U.S. PATENT DOCUMENTS

| | | | |
|---|---|---|---|
| 5,848,785 A * | 12/1998 | Hardwick et al. | 271/11 |
| 5,865,487 A * | 2/1999 | Gore et al. | 294/2 |
| 6,086,125 A * | 7/2000 | Kovacs et al. | 294/65.5 |
| 6,538,544 B1 | 3/2003 | Hardy | |
| 6,663,154 B2 | 12/2003 | Pancheri | |
| 6,666,063 B2 | 12/2003 | Pick et al. | |
| 7,549,833 B2 * | 6/2009 | Tang | 414/797 |
| 7,794,194 B2 * | 9/2010 | Murray et al. | 414/783 |
| 7,963,578 B2 * | 6/2011 | Wells et al. | 294/2 |
| 2004/0165332 A1 | 8/2004 | Beson | |
| 2009/0206972 A1 | 8/2009 | Tunay | |
| 2009/0251263 A1 | 10/2009 | Fullerton et al. | |

* cited by examiner

METHOD AND APPARATUS FOR ORIENTING A LAMINATION

CROSS REFERENCE TO RELATED APPLICATIONS

This is a non-provisional application based upon U.S. provisional patent application Ser. No. 61/699,447 entitled "METHOD AND APPARATUS FOR THE ORIENTATION OF LAMINATIONS", Sep. 11, 2012, which is incorporated herein by reference.

BACKGROUND OF THE INVENTION

1. Field of the Invention

The present invention relates to an orientation device, and, more particularly, to an orientation device for the movement of a metal lamination.

2. Description of the Related Art

Cold rolled steel also referred to as lamination steel, is in common use today for the production of laminations used in electric motors. The ease of stamping cold rolled steel and the resulting low tool wear contribute to the low cost of finished laminations. Whether this or some other material is used to produce the laminations, the process of making laminations include multiple operations before they are assembled as an electric machine, such as an electric motor or an electric generator.

For example, once a lamination is cut from a sheet of steel, features cut into each lamination require that a subsequent operation index the lamination so that additional features can be added to the lamination. This can be handled in different ways. First, once the lamination has had an initial feature imparted to the lamination, the lamination may be stacked in an indexed manner and then moved in a coordinated manner to preserve the indexed position to a subsequent operation. This method unfortunately requires expensive handling of the stack of laminations. A second way is to have a non-indexed stack, then move each lamination to an indexing device, then move the lamination to the subsequent operation. This method suffers from the need to have a separate indexing station and the loss of floor space therefor. A third way is to put the lamination into the subsequent operation and have that device orient the lamination before performing the subsequent operation. This method disadvantageously significantly increases the cost of the tooling and slows the machine down because it first has to orient the lamination before performing a function on the lamination.

What is needed in the art is an effective device to overcome these problems and to present the subsequent operational device with a pre-oriented lamination.

SUMMARY OF THE INVENTION

The present invention provides an effective method and apparatus for the orienting of laminations.

The present invention in one form is directed to a method of orienting a selected item from a stack of similar items, the method including the steps of separating, engaging and orienting. The separating step separates the selected item from the stack using a first attraction force of a transport apparatus. The engaging step engages the selected item with a second attraction force from the transport apparatus. The second attraction force being greater than the first attraction force. The orienting step orients the selected item relative to the transport apparatus as the transport apparatus is en route to a destination location.

The present invention in another form is directed to an orienting device for a selected item from a stack of similar items. The orienting device includes a transport apparatus, an operational apparatus and a controller. The transport apparatus includes a first attraction force apparatus, a second attraction force apparatus and an orientation apparatus coupled to the second attraction force apparatus. The operational apparatus is configured to be a destination location for the selected item and to perform at least one further operation on the selected item. The controller is configured to engage the first attraction force apparatus to separate the selected item from the stack using a first attraction force. The controller is further configured to additionally engage the selected item with a second attraction force from the second attraction force apparatus. The second attraction force is greater than the first attraction force. The controller is yet further configured to activate the orientation apparatus to orient the selected item relative to the transport apparatus as the transport apparatus is en route to the operational apparatus.

An advantage of the present invention is that the lamination is oriented while it is being moved to a workstation.

Another advantage of the present invention is that the lamination is separated from the stack with a lower magnetic field and the magnetic field is increased while the lamination is en route to ensure that it is not dropped.

Yet another advantage of the present invention is that the lamination arrives in a pre-indexed state at the subsequent machine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
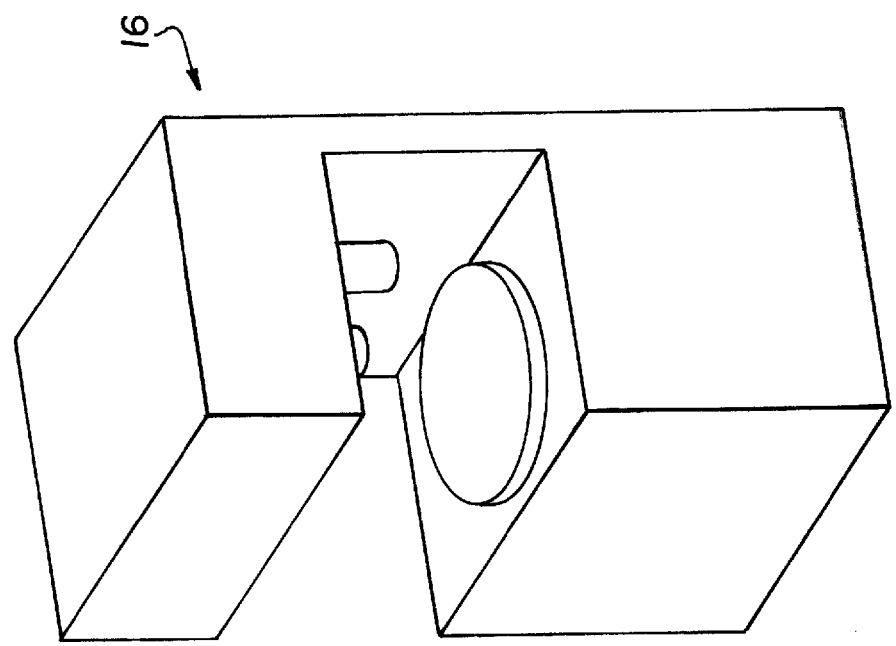
FIG. 1 is a schematic perspective view of an embodiment of an orienting apparatus of the present invention.
Figure 1:
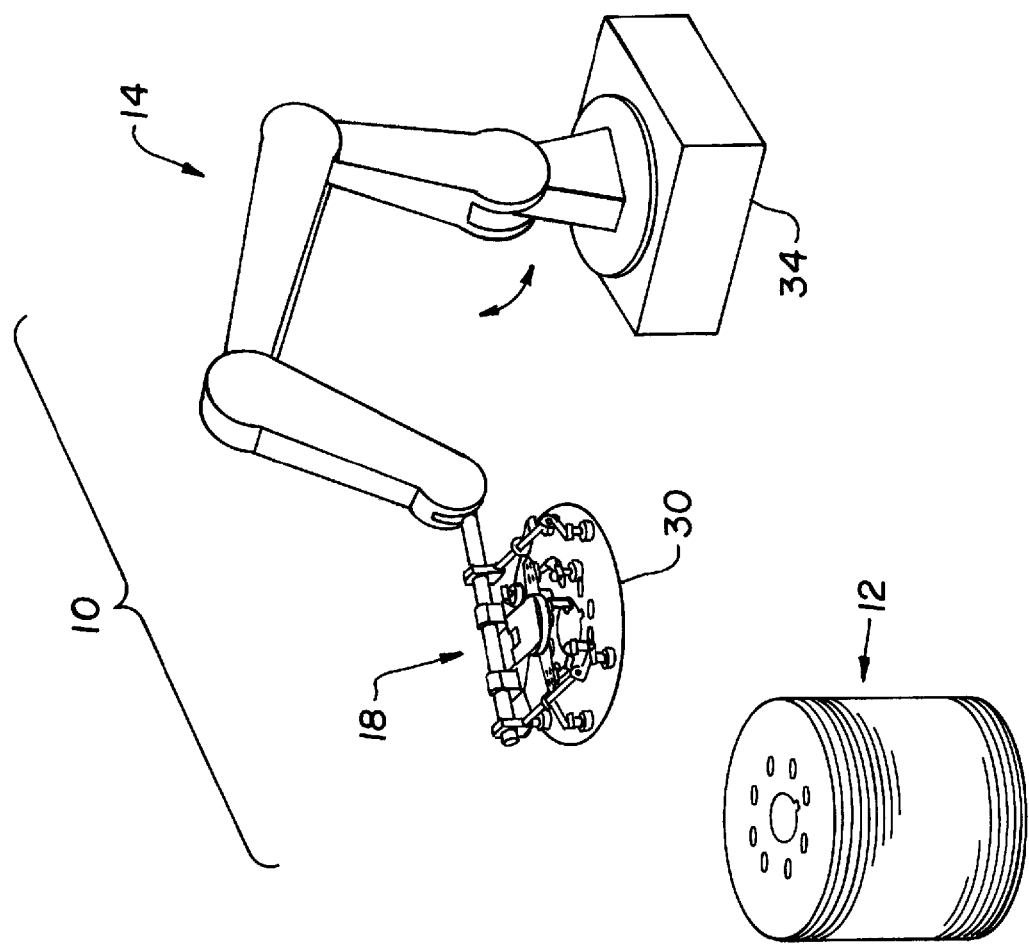

Referring now to the drawings and more particularly to FIG. 1 there is shown an operational center 10 having a stack of laminations 12, a robotic arm 14 and an operational apparatus 16. The stack of laminations 12 has a plurality of laminations that are not rotationally oriented in any particular manner. Robotic arm 14 has a manipulator fixture 18 attached thereto. Robotic arm 14 moves a singular lamination from lamination stack 12 to operational apparatus 16 for a subsequent operation, such as a pressing operation, a machining operation, or any type of operation that requires the lamination to be presented in an indexed or pre-oriented manner.

Figure 2:
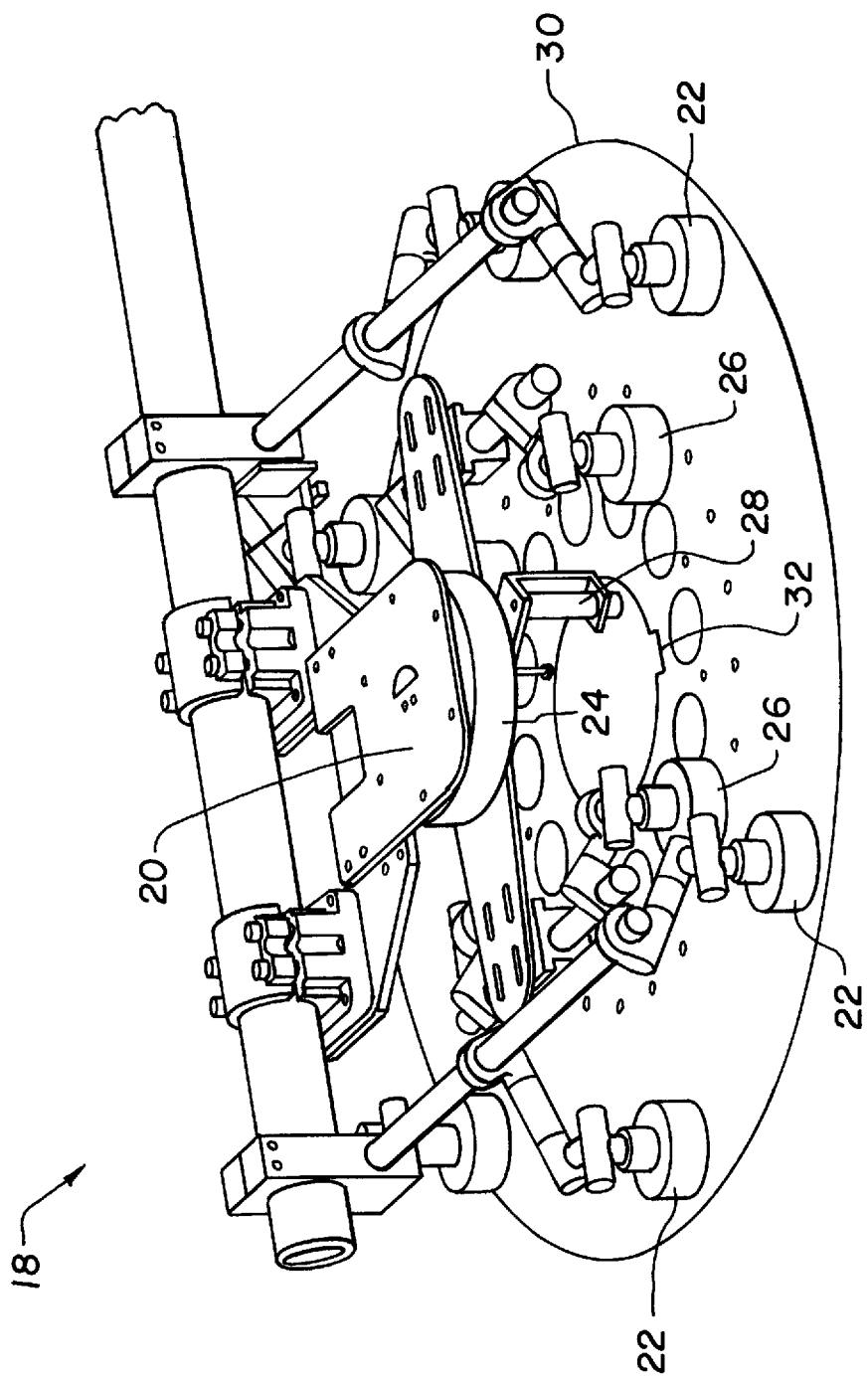
FIG. 2 is a more detailed view of the orienting apparatus of FIG. 1.

Now, additionally referring to FIG. 2 there is shown manipulator fixture 18 that is also referred to as a transport apparatus 18, which is an extension of articulated robotic arm 14. Manipulator fixture 18 includes a rotating apparatus 20, gripping apparatuses 22, a servo 24, gripping apparatuses 26 and a sensor 28. A lamination 30, which is a selected item 30 or a material piece 30, which may be a metal lamination 30 for use in an electric motor or generator (not shown), is shown having a material position locator feature 32, here shown as a notch 32 in piece 30. Numerous material pieces 30 are located at a material source position illustrated here as lamination stack 12, and material pieces 30 may be in a stack with their outer boundaries substantially aligned, but in a random angular arrangement from each other.

Figure 3:
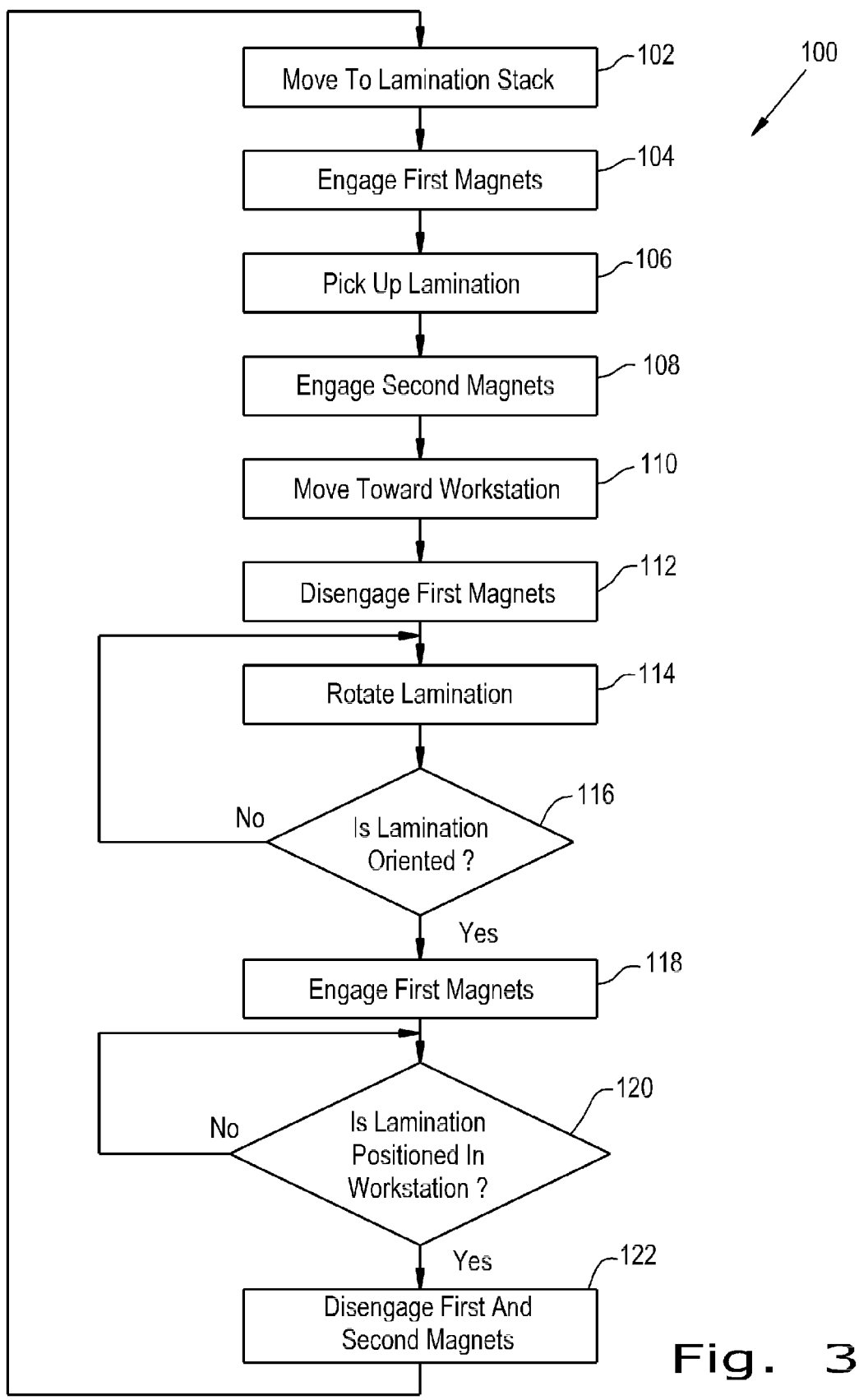
FIG. 3 is schematical flow diagram illustrating the steps used by a method using the orienting apparatus of FIGS. 1 and 2.

Now, additionally referring to FIG. 3, a method 100 illustrates an embodiment of a method of the present invention carried out by a controller 34. At step 102, robotic arm 14 is moved so as to position transport apparatus 18 so that is can pick up a lamination 30 from lamination stack 12. At step 104, manipulator fixture 18 picks up a singular lamination 30 from the material source position and moves it to a workstation 16 where further operations (such as machining, stamping operations, welding, etc.) are preformed on piece 30. Lamination 30 is then removed from workstation 16, perhaps by another robotic arm, and a new lamination 30 is placed into workstation 16 by manipulator fixture 18. After picking up material piece 30 and while moving material piece 30, manipulator fixture 18 rotationally indexes material piece 30 to a desired orientation so that material piece 30 is in the desired angular orientation when it arrives at workstation 16.

More specifically, once manipulator fixture 18 has been moved to the material source position 12, at step 102 then articulated robotic arm 14 positions magnets 22, in contact with or in close proximity to the uppermost lamination 30 in lamination stack 12. At step 104, magnets 22 are activated to grip lamination 30. Then at step 106, robotic arm 14 lifts manipulator fixture 18 along with a lamination 30 from the stack. Note, the figures, for purposes of clarity, do not show pneumatic and/or electrical interconnections. Magnets 22 may be in the form of pneumatically manipulated magnets 22 (although other gripping devices are also contemplated, such as electromagnets, suction devices, etc.) with the strength of magnets 22 being selected such that they collectively are strong enough to lift a single lamination 30, but are not strong enough to lift additional pieces beneath the top piece 30. Magnets 22 are also referred to as a first attraction force device 22, providing a first attraction force to lamination 30, also referred to as a selected item 30.

At step 108, once lamination 30 is lifted from stack 12 then gripping apparatuses 26, in the form of magnets 26, are additionally activated. Magnets 26 are also referred to as a second attraction force device 26, providing a second attraction force to lamination 30. Magnets 26 have a stronger grip or attraction force than magnets 22, since once lamination 30 has been separated from stack 12, there is not a concern about magnetically attracting more than one lamination 30. Movement of lamination 30 toward workstation 16 continues at step 110, while steps 112-118 are carried out. As movement of articulated robotic arm 14 continues, magnets 22 are inactivated at step 112, and lamination 30 is rotated at step 114, while sensor 28 detects the position of notch 32. The control of the rotational orientation takes place by sensor 28 sensing the position of material position locator 32 as servo 24 rotates magnets 26 and lamination 30. At step 116, controller 34 determines if lamination 30 is properly rotationally oriented, if not then rotation continues at step 114. Otherwise, when sensor 28 senses the proper location of material position locator 32, at step 116, then the rotation is stopped since lamination 30 is in the desired rotational orientation for placement into workstation 16. At step 118, magnets 22 are reactivated to further secure lamination 30 to manipulator fixture 18 while lamination 30 is en route to workstation 16. Once lamination 30 is positioned in workstation 16 as detected by step 120, then magnets 22 and 26 are inactivated at step 122, and articulated robotic arm 14 moves manipulator fixture 18 away from workstation 16 and method 100 is repeated, while the lamination 30 that has been delivered to workstation 16 is operated upon.

Sensor 28 may be in the form of an optical sensor, a magnetic field sensor or a physical contacting sensor, or any sensor capable of detecting a material positioning feature 32 on lamination 30. Controller 34 uses information from sensor 28 to control servo 24 as it rotates lamination 30. Controller also controls the functioning of transport apparatus 18 and robot 14 in the carrying out of method 100. The activation and inactivation of magnets 22 and 26 by controller 34 may be a manipulation of the orientation of the magnets so that more or less of the magnetic fields emanating therefrom is directed toward lamination 30. Controller 34 may be separate from, or integral with, the control system that controls articulated robotic arm 14. If separate then there may be an interface between the control systems to control the timing of the operation described herein.

Advantageously, the present invention reduces the need for extra fixturing, such as an orientation station, also reducing the overall footprint of the operation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of orienting a selected item from a stack of similar items, the method comprising the steps of:
    separating the selected item from the stack using a first attraction force of a transport apparatus;
    engaging the selected item with a second attraction force from said transport apparatus, said second attraction force being greater than said first attraction force;
    orienting the selected item relative to said transport apparatus as said transport apparatus is en route to a destination location; and
    disengaging said first attraction force after said engaging step and prior to said orienting step, said first attraction force is provided by at least one first magnet, said at least one first magnet being fixed in position relative to said transport apparatus, said second attraction force is provided by at least one second magnet, said orienting step includes the step of moving said at least one second magnet and the selected item relative to said at least one first magnet.

2. The method of claim 1, wherein said at least one second magnet is rotatable relative to said at least one first magnet.

3. The method of claim 1, further comprising the step of sensing a feature of the selected item, said feature being positioned by said moving step to align said feature relative to said transport apparatus in a predetermined position.

4. The method of claim 3, further comprising the step of reengaging said at least one first magnet with the selected item.

5. The method of claim 4, wherein said at least one first magnet is a plurality of first magnets, said at least one second magnet is a plurality of second magnets, a total attractive force of said first magnets being less than a total attractive force of said second magnets.

6. The method of claim 5, further comprising the steps of:
positioning the selected item at the destination location; and
disengaging said first magnets and said second magnets.

7. An orienting device for a selected item from a stack of similar items, the orienting device comprising:
a transport apparatus including:
a first attraction force apparatus;
a second attraction force apparatus; and
an orientation apparatus coupled to said second attraction force apparatus;
an operational apparatus configured to be a destination location for the selected item and to perform at least one further operation on the selected item; and
a controller configured to engage said first attraction force apparatus to separate the selected item from the stack using a first attraction force; said controller being further configured to additionally engage the selected item with a second attraction force from said second attraction force apparatus, said second attraction force being greater than said first attraction force, said controller being further configured to activate said orientation apparatus to orient the selected item relative to said transport apparatus as said transport apparatus is en route to said operational apparatus, said controller being further configured to disengage said first attraction force apparatus after said second attraction force is engaged and prior to engaging said orientation apparatus, said first attraction force apparatus is at least one first magnet, said at least one first magnet being fixed in position relative to said transport apparatus, said second attraction force apparatus is at least one second magnet, said orientation apparatus is configured to move said at least one second magnet and the selected item relative to said at least one first magnet.

8. The orienting device of claim 7, wherein said at least one second magnet is rotatable relative to said at least one first magnet.

9. The orienting device of claim 7, wherein said transport apparatus further comprises a sensor configured to sense a feature of the selected item, said feature being positioned by said orientation apparatus by aligning said feature relative to said transport apparatus in a predetermined position.

10. The orienting device of claim 9, wherein said controller is further configured to reengage said at least one first magnet with the selected item after the selected item is in said predetermined position.

11. The orienting device of claim 10, wherein said at least one first magnet is a plurality of first magnets, said at least one second magnet is a plurality of second magnets, a total attractive force of said first magnets being less than a total attractive force of said second magnets.

12. The orienting device of claim 11, wherein said controller is further configured to position the selected item at the destination location and to disengage said first magnets and said second magnets from the selected item.

* * * * *